March 31, 1970  K. WISSEROTH ETAL  3,503,944
POLYMERIZATION OF ETHYLENE
Filed May 16, 1967

INVENTORS:
KARL WISSEROTH
HANS GEORG TRIESCHMANN
HEINRICH MOHR
LOTHAR REUTER
RICHARD SCHOLL
BY
*Marzall, Johnston, Cook & Root*
ATT'YS United States Patent Office 3,503,944
Patented Mar. 31, 1970

3,503,944
POLYMERIZATION OF ETHYLENE
Karl Wisseroth, Ludwigshafen (Rhine), Hans Georg Trieschmann, Hambach, Weinstrasse, Heinrich Mohr, Frankenthal, Pfalz, Lothar Reuter, Ludwigshafen (Rhine), and Richard Scholl, Gruenstadt, Pfalz, Germany, assignors to Badische Anilin- & Soda-Fabrik Aktiengesellschaft, Ludwigshafen (Rhine), Germany
Continuation-in-part of application Ser. No. 314,032, Oct. 4, 1963. This application May 16, 1967, Ser. No. 642,642
Claims priority, application Germany, Oct. 6, 1962, B 69,124
Int. Cl. C08f 1/66, 1/06
U.S. Cl. 260—88.2                     3 Claims

ABSTRACT OF THE DISCLOSURE

Polymerization of ethylene at pressures of 5 to 100 atmospheres and temperatures of 130° to 230° C. while bringing the ethylene into contact with a mechanically agitated melt of polyethylene in which a catalyst containing chromium trioxide is dispersed. The process gives a particularly high yield of polyethylene with reference to the amount of catalyst used.

Figure 1:
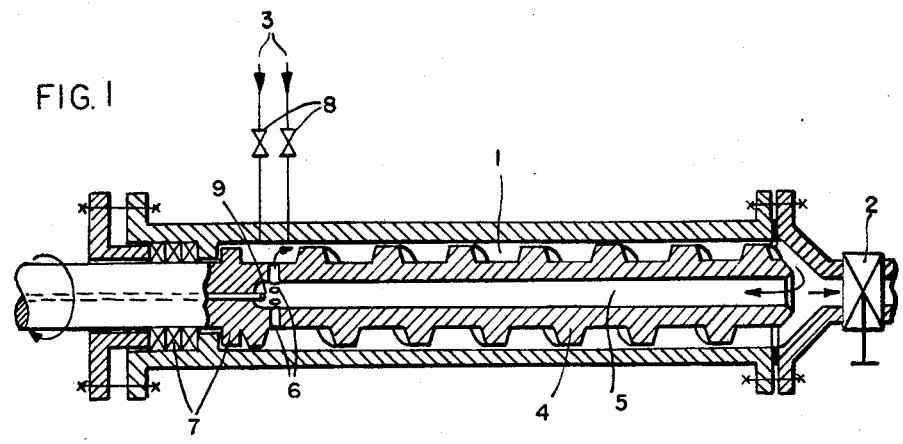

This application is a continuation-in-part of application Ser. No. 314,032, filed Oct. 4, 1963.

This invention relates to a process for the polymerization of ethylene and apparatus for carrying out the process.

It is known that polyethylene having a density between 0.916 and 0.93 can be prepared by polymerization of ethylene at pressures of more than 1,000 atmospheres. The high pressures necessary usually involve considerable expenditure for apparatus. A low-pressure polymerization process is also known but only polyethylenes having densities of more than about 0.945 could hitherto be prepared thereby on a commercial scale. This low-pressure process is usually carried out in solution or suspension using so-called Ziegler catalysts or catalysts based on oxides of metals of Group VI–B of the periodic system of elements (see Periodic Chart of the Elements in Handbook of Chemistry and Physics, 38th edition, Chemical Rubber Publishing Co., Cleveland, Ohio, U.S.A., page 394). Separation and purification of the solvent used involves considerable expenditure for apparatus in this known low-pressure process. It is also known that ethylene can be polymerized at low pressure using Ziegler catalysts and also catalysts containing metal oxides at temperatures below the melting point of the ethylene polymers formed. In this so-called gas phase process, however, very high molecular weight ethylene polymers are generally obtained which have molecular weights of more than 200,000 and which must be degraded for many purposes, for example for processing by injection molding. Of the processes in which oxides of metals of Group VI–B of the periodic system of elements are used in the low-pressure polymerization of ethylene, the process known from U.S. patent specification No. 2,825,721 is of particular interest in which catalysts containing chromium oxides, particularly chromium trioxide, are used in which silicon dioxide or aluminum oxide or mixtures or compounds of silicon dioxide and aluminum oxide, for example aluminum silicate, are used as carriers for the chromium oxides. It is known that this process, too, may be carried out in the absence of solvents, i.e. in the gas phase at temperatures below the melting point of the ethylene polymers, but polymers having molecular weights between about 200,000 and 500,000 are thus obtained (U.S. patent specification No. 2,963,470).

This polymerization process is carried out in dilute solution in solvents and the maximum concentration of the polyethylene in the reaction mixture is about 10% by weight.

U.S. patent specification 2,894,824 describes a further development of the process according to U.S. patent specification 2,825,721, in which polymerization is carried out in a more concentrated solution. In this case, the concentration of polyethylene in the reaction mixture is from 10 to not more than 50% by weight and relatively large amounts of catalyst are required. Owing to the high viscosity of the polyethylene solution the polymerization is carried out in special reactors provided with screw-type stirrers or conveyors. However, the process has the disadvantage that the catalyst yield (i.e. the yield of polyethylene in grams per gram of catalyst) is not more than approx. 70. After polymerization, the reaction mixture must therefore be diluted with an additional amount of solvent to a polyethylene content of 3% and the solution obtained, after having been freed from residual catalyst, has to be worked up in several stages with separation of the solvent. This involves considerable expenditure for apparatus.

The object of this invention is to provide a process for polymerizing ethylene in which ethylene polymers having molecular weight of less than 200,000 are obtained without the coemployment of solvents and at pressures up to a maximum of 100 atmospheres. Another object of this invention is to provide a process for polymerizing ethylene in which ethylene polymers having a density of less than 0.945 can be obtained at pressures up to a maximum of 100 atmospheres. Yet another object of this invention is to provide a process for polymerizing ethylene in which ethylene polymers can be prepared at pressures up to a maximum of 100 atmospheres with a particularly low expenditure for apparatus. Other objects of the invention will be evident to those skilled in the art from the following description.

These objects can be achieved according to this invention by polymerizing ethylene in the presence of preformed ethylene polymer and in the absence of other diluents and using catalysts containing chromium oxides at pressures of 5 to 100 atmospheres, by allowing ethylene to act on a mechanically moved dispersion of the catalyst in molten ethylene polymer at a temperature between 130° and 230° C. Ethylene may be polymerized continuously or batchwise, alone or in admixture with other olefins, such as, in particular, α-monoolefins having three to six carbon atoms, for example propylene, butene-1, pentene-1 and 4-methylpentene-1, by the process. For copolymerization it is preferred to use mixtures of ethylene with up to 25% by weight of propylene or butene-1 with reference to the mixture.

Conventional polymerization catalysts containing chromium oxides, particularly chromium trioxide, are suitable and they may also be modified with nickel compounds. The chromium oxides may be applied in the conventional way and in the conventional amounts to carriers, particularly silicon dioxide and aluminum oxide or mixtures or compounds of silicon dioxide and aluminum oxide, for example aluminum silicates. The production of the catalysts is known for example from U.S. patent specification No. 2,825,721. The catalysts may also be thermally activated in the conventional way prior to the polymerization, as known for example from the said specification.

Polymerization in the process according to the invention is carried out at temperatures between about 130° and 230° C. The temperature range of 150° to 180° C., in which ethylene polymers having molecular weights of between 40,000 and 100,000 are obtained, is preferred.

In the temperature range of 200° to 230° C., waxy polymers having molecular weights of more than 1,000 are obtained, and in the temperature range between 130° and 150° C. film-forming polyethylenes having molecular weights of between 100,000 and 200,000 are obtained. Pressures of 20 to 50 atmospheres are of particular interest for the process for economic reasons. In the homopolymerization of ethylene, polyethylenes having a density of more than 0.945 are generally obtained, and in copolymerization of ethylene, ethylene polymers are obtained having a density of less than 0.945, for example about 0.935 or even less, for example 0.925. Very small amounts of catalysts are sufficient. Generally 0.05 to 1 g. of a catalyst containing 0.1 to 10% by weight of chromium oxides, particularly chromium trioxide, with reference to the weight of the catalyst, is used for each kg. of ethylene to be polymerized or for each kg. of olefin mixture containing ethylene.

The solid polymerization catalyst is dispersed in the molten ethylene polymer in the process according to this invention and the dispersion is moved mechanically while it is acted upon by ethylene if desired in admixture with other olefins. The ethylene should contact the largest possible surface of the melt containing the catalyst. Mechanical movement of the melt containing the catalyst may be carried out for example in autoclaves fitted with stirring means, autoclaves having built-in kneading mechanism or with particular advantage in pressure-resistant screw extruders.

Figure 2:
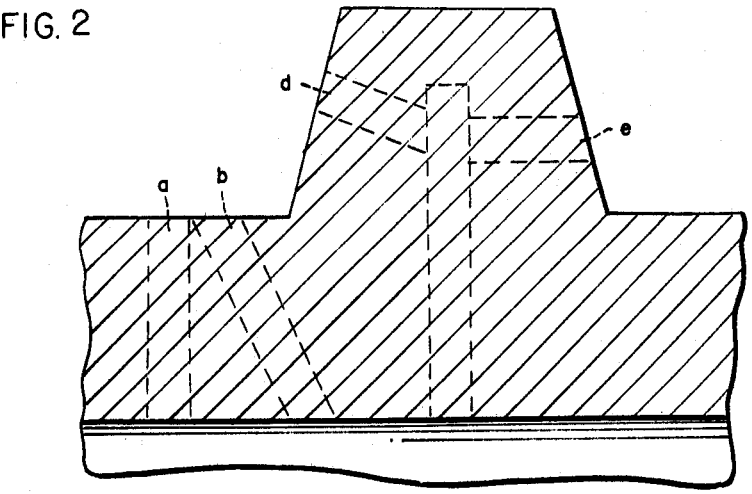

The accompanying drawing shows in sectional elevation in FIGURE 1 and as a detail in FIGURE 2 a screw extruder which is particularly suitable for carrying out the process according to this invention. This screw extruder has a barrel chamber 1, discharge means 2, supply lines 3 and screw 4. The screw 4 of the extruder, which may be driven by a motor (not shown), is provided in the region of the barrel chamber 1 with an axial bore 5 and with a plurality of openings 6 perpendicular or inclined to the axis in the wall of the hollow screw, and the said chamber is also provided with at least two supply lines 3. The axial bore 5 extends from the end of the screw 4 adjacent to the discharge means 2 to the zone of the barrel chamber 1 which is defined by the seal 7 between the screw and the barrel and the supply line 3 nearest to this seal. The openings 6 in the wall of the hollow screw are preferably provided in the region of the supply line 3 provided for the ethylene feed which is arranged on the screw chamber nearest to the seal 7 between screw and barrel. If the process is carried out in an extruder of this type, the mixture of molten ethylene polymer, catalyst, ethylene and any other olefins used is moved by the screw in the direction of the discharge means 2. The discharge means can be regulated and in general discharges a portion of the reaction mixture conveyed by the screw, preferably 10 to 50% by weight, from the barrel 1. The discharged portion of the reaction mixture may then be degassed, for example in an attached vacuum screw apparatus (not shown) and granulated in the conventional way. The unreacted ethylene thus separated may be returned to the polymerization, together with any other unreacted olefins. The reaction mixture which is not discharged is forced back through the bore 5 (i.e. the hollow portion of the screw) and is extruded therefrom through the openings 6 in the form of a number of strands. Fresh ethylene, if desired mixed with other olefins, and also fresh catalyst corresponding to the amount of reaction mixture discharged, may be fed in through supply lines 3 which may be provided with valves 8. The concentration of the catalyst containing chromium oxide is advantageously between 0.005 and 0.02% by weight with reference to the amount of ethylene polymer in the reaction chamber. The screw extruder is advantageously provided with cooling means and heating means (not shown). The temperature of the reaction mixture may be measured for example by a thermocouple 9 which is passed in from the motor driven end of the screw through the seal 7 up to the openings 6 in the hollow portion of the screw. The supply lines 3 are used for feeding in ethylene and catalyst. Generally speaking one supply line is sufficient for supplying ethylene or the mixture of ethylene with other olefins and one for the catalyst. However it is also possible to provide more than one supply line for the ethylene feed and/or for the catalyst feed. The supply lines 3 are preferably located near to the seal 7 and spaced from this at the most by a few cleaning threads. The catalyst may be supplied to the screw extruder through one or more supply lines 3, advantageously in the form of a concentrate, for example suspended in molten ethylene polymer or preferably dispersed in low molecular weight polyolefin waxes.

The openings 6 may be provided in various ways, for example perpendicular or inclined, in the wall of the hollow screw, as indicated in FIGURE 2. For example the openings may be provided in the cross section of the core as indicated at $a$ or $b$, or in the flanks of the screw thread as indicated at $d$ or $e$. The openings may be circular, oval or in the form of small slots.

The ethylene polymers obtained by the process may be used for the production of molded articles, such as films, sheets, coatings, household articles and parts of apparatus.

A particular advantage of the process according to the invention is that high catalyst yields are obtained, which are in general above 1,000 and frequently between 5,000 and 10,000 or more. Separation of residual catalyst, e.g. by dissolving the polymers, filtering the solution obtained etc., is not necessary. Expenditure for apparatus is therefore particularly low in the process according to the invention, especially as the reaction product can be discharged from the reactor—either immediately or after passing a devolatilizing zone—in the form of spaghetti-like strands, which is particularly advantageous for granulating, and then granulated in the usual way.

The invention will be further illustrated by the following examples in which the parts specified are parts by weight, unless otherwise stated. The parts by volume mentioned therein bear the same relation to parts by weight as the liter to the kilogram. The olefins used for the examples are passed over aluminum oxide at elevated temperature prior to the polymerization in order to purify them. The molecular weights given in the examples are determined according to E. Duch and L Küchler, Z. Elektrochem. 60 (1956) 218.

EXAMPLE 1

In an autoclave having a free volume of 1,000 parts by volume and fitted with a stirrer, 0.25 part of catalyst containing chromium oxide is added to 20 parts of finely granular polyethylene having a molecular weight of 345,000 at 100° C. under purified ethylene. The catalyst containing chromium oxide is prepared in the conventional way and contains 5% by weight of chromium trioxide on a carrier composed of aluminum silicate having a content of 15% by weight of aluminum oxide. Ethylene is then forced into the autoclave up to a pressure of 35 atmospheres and the whole heated to 150° to 160° C. within half an hour. After polymerization with stirring at 150° to 160° C. for two hours under a pressure of 35 atmospheres, 360 parts of polyethylene is obtained which has a density of 0.965, a mean molecular weight of 92,000 and an ash content of 0.075% by weight.

EXAMPLE 2

In a way analogous to that described in Example 1, a mixture of ethylene and 15% by weight of proplylene is polymerized at 180° C. with stirring under a pressure of 25 atmospheres, 283 parts of a mixture of 20 parts of polyethylene having a molecular weight of 345,000 and 263 parts of a copolymer of ethylene and propylene having a density of 0.926 and a mean molecular weight of 67,000 is obtained. The ash content is 0.09% by weight. The mixture has the same flexibility as high-pressure polyethylene prepared in the conventional way.

EXAMPLE 3

A mixture of ethylene with 12% by weight of butene-1 is polymerized at 140° C. for three hours with stirring at a pressure of 45 atmospheres in an autoclave fitted with a stirrer, analogously to the description in Example 1. A mixture of 20 parts of polyethylene having a molecular weight of 345,000 and 300 parts of a copolymer of ethylene and butene-1 is obtained. The mixture has a density of 0.929 and a mean molecular weight of 185,000. Its ash content is 0.08% by weight. The flexibility of the mixture is substantially equal to that of a high-pressure polyethylene prepared by a conventional method.

EXAMPLE 4

The apparatus used is as shown in the drawing, there being one supply line for ethylene and one for catalyst. Ethylene is continuously polymerized in the apparatus at a pressure of 35 atmospheres and a temperature of 155° C. The free volume of the bore of the screw is 1,000 parts by volume. The openings 6 in the hollow screw are provided in the core cross-section in the region of the first screw thread, i.e. in the region of the supply line for ethylene; they are eight in number and circular in cross-section. The screw of the extruder rotates at 10 r.p.m. During each hour, about 200 parts of ethylene and about 1 part of a mixture of 0.02 part of the catalyst specified in Example 1 and 1 part of a waxy polyethylene having a molecular weight of about 500 are fed into the extruder. The discharge means of the extruder extrudes about 200 parts per hour of the reaction mixture which is then degassed in a vacuum extruder and granulated. The polyethylene obtained has a density of 0.962 and a mean molecular weight of 85,000 and contains 0.010% by weight of ash constituents. It also has the following properties:

Tensile strength—250 kg./cm.$^2$
Ultimate tensile strength—270 kg./cm.$^2$
Elongation—650%

EXAMPLE 5

0.75 part of a catalyst containing 0.25% by weight of chromium trioxide on an aluminum silicate is introduced at 130° C. into 20 parts of molten polyethylene wax having a mean molecular weight of about 2,000 in an autoclave having a free volume of 1,000 parts by volume and fitted with a stirrer. The aluminum silicate used as carrier for the chromium trioxide has an aluminum oxide content of 15% by weight. Ethylene is forced into the autoclave to a pressure of 90 atmospheres and the temperature is kept by cooling at 130° to 135° C. After polymerization for four hours at 130° C. to 135° C. while stirring and under a pressure of 90 atmospheres, 320 parts of polyethylene is obtained having a density of 0.963, a mean molecular weight of 180,000 and an ash content of 0.21% by weight.

EXAMPLE 6

0.1 part of a catalyst containing 8% by weight of chromium trioxide is added to 20 parts of polyethylene wax having a mean molecular weight of 2,000 at 190° C. in an autoclave having a free volume of 1,000 parts by volume and fitted with a stirrer. The support for the catalyst is an aluminum silicate having an aluminum oxide content of 15% by weight. Ethylene is forced into the autoclave to a pressure of 5.1 atmospheres and the temperature is kept at about 190° C. After polymerization for two hours under the said pressure and temperature conditions, 260 parts of waxy polyethylene is obtained having a density of 0.967, a mean molecular weight 13,000 and an ash content of 0.038% by weight.

EXAMPLE 7

A mixture of 85% by volume of ethylene and 15% by volume of propylene is continuously polymerized at a temperature of 155° C. and at a pressure of 35 atmospheres in a screw extruder as described in Example 4. For this purpose, 0.02 part per hour of a catalyst having the composition described in Example 1 is added to the extruder. About 200 parts of molten copolymer is removed from the extruder per hour through a discharge means and is then degassed in a vacuum extruder and granulated. The copolymer has a mean molecular weight of 75,000, an ash content of 0.0088% by weight, and a density of 0.922; it contains 38 methylene groups to each 1,000 carbon atoms, which is equivalent to a propylene content of about 11.0% by weight. This product is substantially similar in mechanical behaviour to a high-pressure polyethylene prepared by a conventional method.

We claim:
1. In a process for the production of homopolymers and copolymers of ethylene having a molecular weight between 1,000 and 200,000 by a polymerization carried out in the presence of polymers of ethylene at a pressure of from 5 to 100 atmospheres and using a catalyst which contains chromium trioxide, the improvement which comprises bringing ethylene at a temperature of between 130° and 230° C. into contact with a mechanically agitated dispersion of the catalyst in a molten normally solid polymer of ethylene, said dispersion being substantially free of solvents.

2. A process as claimed in claim 1 for the production of homopolymers and copolymers of ethylene having a molecular weight between about 40,000 and 100,000, wherein said polymerization is carried out at a temperature between about 150° C. and 180° C.

3. A process as claimed in claim 2 wherein the dispersion of the catalyst in the molten normally solid polymer of ethylene is mechanically agitated in contact with the ethylene being polymerized by means of a screw extruder.

References Cited

UNITED STATES PATENTS 2,970,135   1/1961   Lanning et al. _____ 260—94.9

JAMES A. SEIDLECK, Primary Examiner
E. J. SMITH, Assistant Examiner

U.S. Cl. X.R.

18—12; 23—285, 288; 260—94.9

PO-1050
(5/69)

UNITED STATES PATENT OFFICE
CERTIFICATE OF CORRECTION

Patent No. 3,503,944          Dated March 31, 1970

Inventor(s) Karl Wisseroth et al

It is certified that error appears in the above-identified patent and that said Letters Patent are hereby corrected as shown below:

In the references:
insert:
-- 3,255,135   6/1966   Schmidle et al------------260-93.7
    2,772,259   11/1956   Hagermeyer----------------260-94.9
    2,894,824   7/1959   Lanning-------------------260-93.7 --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents